United States Patent [19]
Folmer

[11] Patent Number: 5,444,912
[45] Date of Patent: Aug. 29, 1995

[54] METHOD FOR FORMING AIRCRAFT ENGINE NACELLE EXHAUST MIXERS AND SIMILAR PRODUCTS

[76] Inventor: Carroll W. Folmer, 29781 Pebble Beach Dr., Sun City, Calif. 92586

[21] Appl. No.: 145,944

[22] Filed: Oct. 29, 1993

[51] Int. Cl.⁶ ............................................. B23P 15/00
[52] U.S. Cl. .................................. 29/890.01; 29/469.5
[58] Field of Search .................... 29/890.01, 469.5; 72/63, 58; 228/44.3, 193, 235.1, 173.6

[56] References Cited

U.S. PATENT DOCUMENTS

| | | | |
|---|---|---|---|
| 3,701,190 | 10/1972 | Stone, Jr. | 72/63 |
| 3,996,019 | 12/1976 | Cogan | 228/193 |
| 4,263,375 | 4/1981 | Elrod | 228/193 |
| 4,707,225 | 11/1987 | Schuler et al. | 29/890.01 |
| 4,716,640 | 1/1988 | Jourdain et al. | 29/890.01 |
| 4,720,901 | 1/1988 | Johnson et al. | 29/890.01 |
| 4,766,657 | 8/1988 | Singer | 29/890.01 |
| 4,856,163 | 8/1989 | Horiuchi et al. | 29/890.01 |
| 4,889,276 | 12/1989 | Cadwell et al. | 228/265 |
| 5,221,045 | 6/1993 | McAninch et al. | 29/890.01 |

Primary Examiner—Irene Cuda
Attorney, Agent, or Firm—Charles C. Logan, II

[57] ABSTRACT

A method for forming aircraft nacelle mixers by rolling and welding a cylinder of metal to a predetermined diameter and then taper machining to an empirically determined thickness which allows it to be end sealed, longitudinally end loaded, and pressure formed to a preform die before final pressure forming to a finish die.

4 Claims, 11 Drawing Sheets

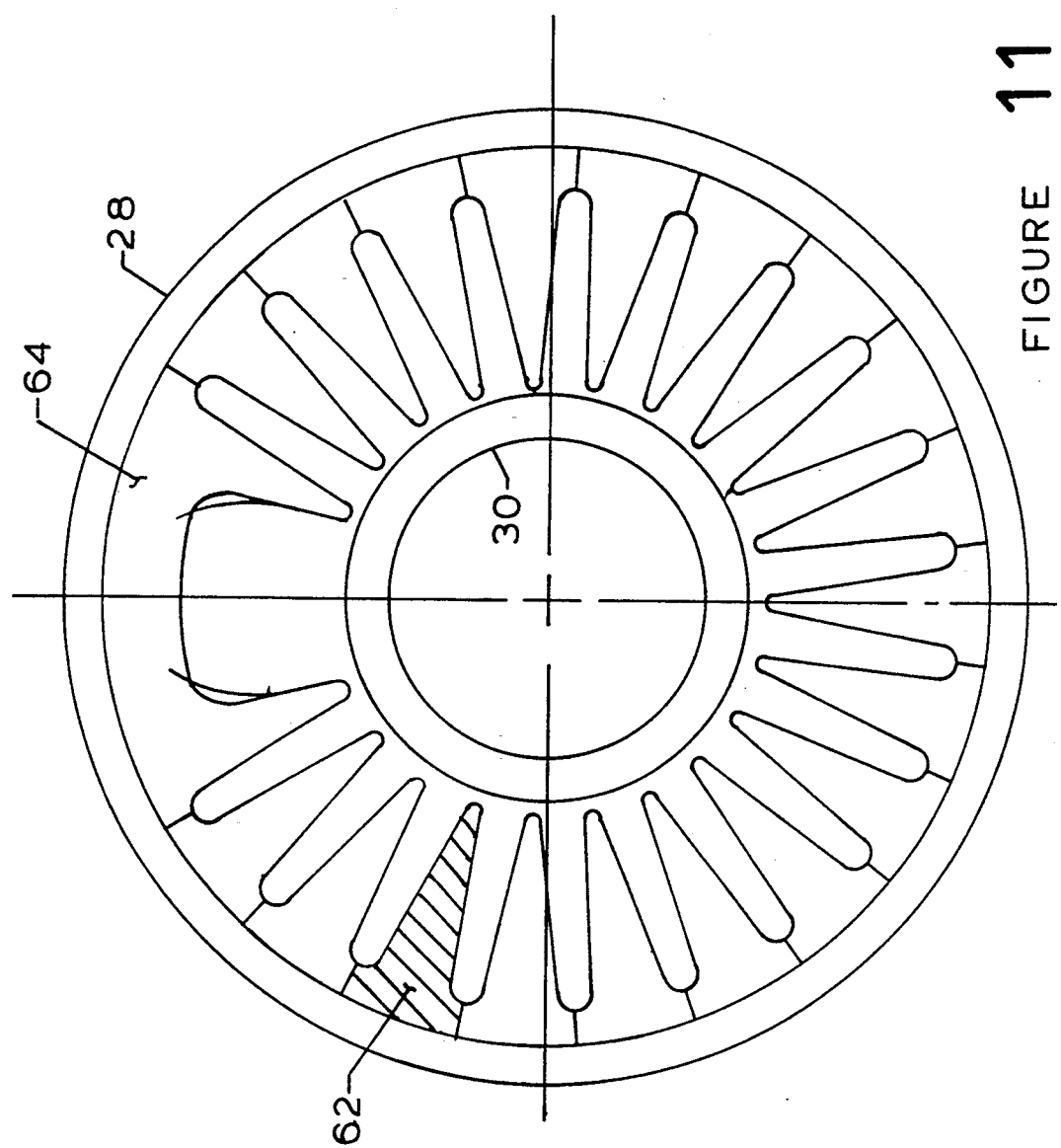

METHOD FOR FORMING AIRCRAFT ENGINE NACELLE EXHAUST MIXERS AND SIMILAR PRODUCTS

This invention is related to my co-pending patent applications:

"A METHOD OF HEAT ASSISTED SHEET METAL FORMING IN 360 DEGREE SHAPES", SER. NO.: 08/095,109,

"A METHOD FOR FORMING LARGE 360 DEGREE SHEET METAL SHAPES USING LONGITUDINAL END LOADING", SER. NO.: 08/095,686,

"AN APPARATUS FOR HIGH PRESSURE HYDRAULIC FORMING OF SHEET METAL BLANKS, FLAT PATTERNS, AND PIPING", SER. NO.: 08/145,946.

BACKGROUND—FIELD OF INVENTION

This invention relates to the sheet metal forming of shapes for the aerospace and related industries.

BACKGROUND—DESCRIPTION OF PRIOR ART

There are factories and subcontractors who produce mixers. Most of them produce each lobe separately and then weld the lobes together to form a mixer. In the mixer depicted in this treatise there are 22 common lobes and one unique lobe.

Although they have established a successful history, they suffer from some disadvantages:

They suffer from handling and trimming so many pieces. They must create a weld jig to hold the pieces and attempt to cool during the welding to avoid adverse warpage during the welding. Most of them do not have any means to size after welding, so the products are questionable as to their accuracy. It is difficult to roll planish or grind the welds after welding in order to even get close to the aerodynamic requirements.

Some factories use drop hammers which emit lead particles into the air and are under attack by environmentalist.

Aerodynamic smoothness are virtually impossible to meet with so much welding without forming after welding.

Most factories form cold as they are not equiped to use heat assist forming.

OBJECTS AND ADVANTAGES

Accordingly, besides the objects and advantages of the forming method described in my patent, several objects and advantages of the present invention are:

(a) By rolling, welding, and planishing a cylinder and profile machining the same to an empirically determined thickness we can form a one-piece mixer.

(b) The longitudinal welding is further smoothed out during the profile machining so aerodynamic smoothness is assured.

(c) Longitudinal end loading is available to optimize the starting thickness.

(d) Heat assist is available to assure maximum elongation is attained.

(e) Gas pressure will be used to size siamese (two at a time) mixers to the dies assuring accuracy and the most cost effective mixer possible.

(f) The facility has provisions for heat and vacuum/argon gas forming of titaniums or other materials that require a clean atmosphere. Titaniums can be formed almost contaminent free.

SUMMARY OF THE INVENTION

Accordingly the reader will see that a multitude of materials can be formed in this facility, accurately, cost effectively, and meet aerodynamic specifications in that:

A singular cylinder replaces 48 pieces normally made separately and welded together to form 2 mixers.

The cylinder is profile machined to an empirically determined thickness along its length.

The cylinder is longitudinally end loaded to furnish material to the forming area and reduce material thickness for cost effectiveness.

Shape is final formed to dies resulting in a shape that is smooth, accurate, and that will meet aerodynamic smoothness requirements.

The facility has provisions for heat and vacuum/argon gas forming of titaniums or other materials that require a clean atmosphere. Titaniums can be formed almost contaminent free.

Heat assist can be used for materials other than titanium for maximum elongation if required.

As noted, this application has at its disposal all of the features noted in the co-pending patent application "A Method of Heat Assisted Sheet Metal Forming in 360° Degree Shapes", "A Method for Forming Large 360° Sheet Metal Shapes Using Longitudinal End Loading", and "An Apparatus for High Pressure Hydraulic Forming of Sheet Metal Blanks, Flat Patterns, and Piping".

Although the summary description contains many specificities, these should not be construed as limiting the scope of the invention but as merely providing illustration of some of the presently preferred embodiments of this invention. For example other uses of the facility have been identified in Cross-References to Related Applications.

Thus the scope of the invention should be determined by the appended claims and their legal equivalents, rather than by the examples given.

BRIEF DESCRIPTION OF THE DRAWINGS

FIG. 11 is cut that depicts the multiple dies and the unique die at the top contained by the tapered case.

REFERENCE NUMERALS IN DRAWINGS

14—Overhead Transfer Beam
16—Part Loading Winch
18—Case and Die Winch
20—Controller/Recorder
22—Die Positioner
24—Holder Mount Ring
26—Preform
26B—Preformed Shape from 26
26C—Finished Shape from 26B
28—Case
30—Preform Blade Holder Upper
30B—Preform Blade Holder Lower
32—Stantion
34—Double Action Actuator
36—Plunger
38—O-Ring Seal-Plunger to Holder
40—O-Ring Seal-Plunger to Reactor
42—Pressure Reactor
44—Seal Upper Holder to Lower
46—Forming Pressure Tube
48—Delivery Tube-Actuator
50—Threaded Rod Pressure Reactors
52—Base
54—Preform Blade-Common
56—Preform Blade-Unique
58—O-Ring Holder to Preform
60—Final Forming Pressure Tube
62—Die Common
64—Die Unique
66—Sealing Cylinder Upper
68—Sealing Cylinder Lower
70—Die Stantion

DESCRIPTION OF THE PREFERRED EMBODIMENT

The drawings in this treatise depict a method for forming an engine/nacelle mixer without a lot of pieces and adverse welding.

Figure 1:
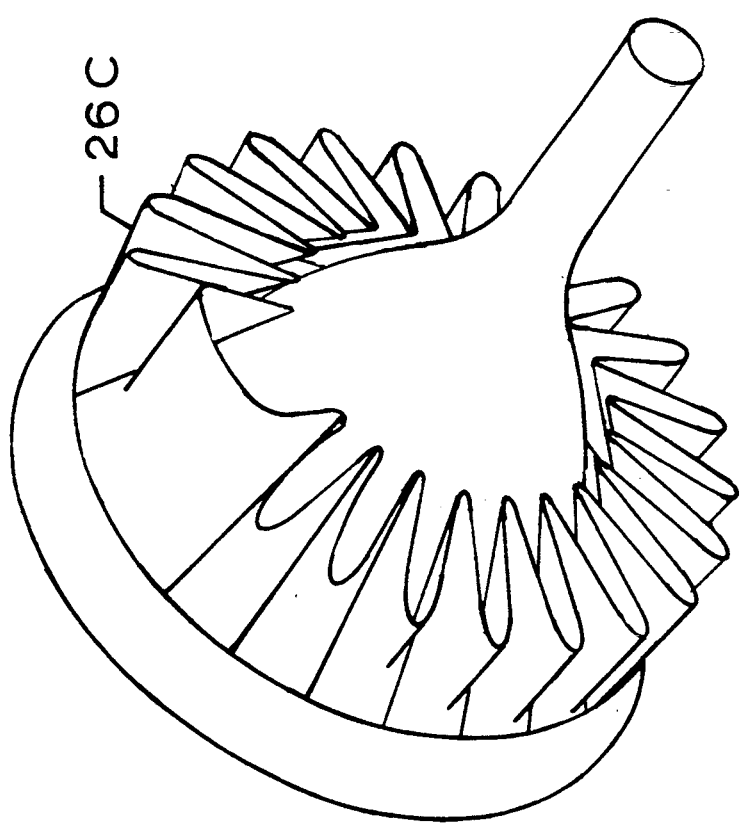
FIG. 1 is an isometric showing a mixer surrounding a centerbody and is provided for an understanding of the type of part we will ultimately be producing.

FIG. 1 is an isometric view of a mixer surrounding a centerbody and is provided for an understanding of the type of part we will ultimately be producing. The circumference at the rear end is approximately 4.5 times the circumference at the forward end due to the convoluted shape at the rear end.

Figure 2:
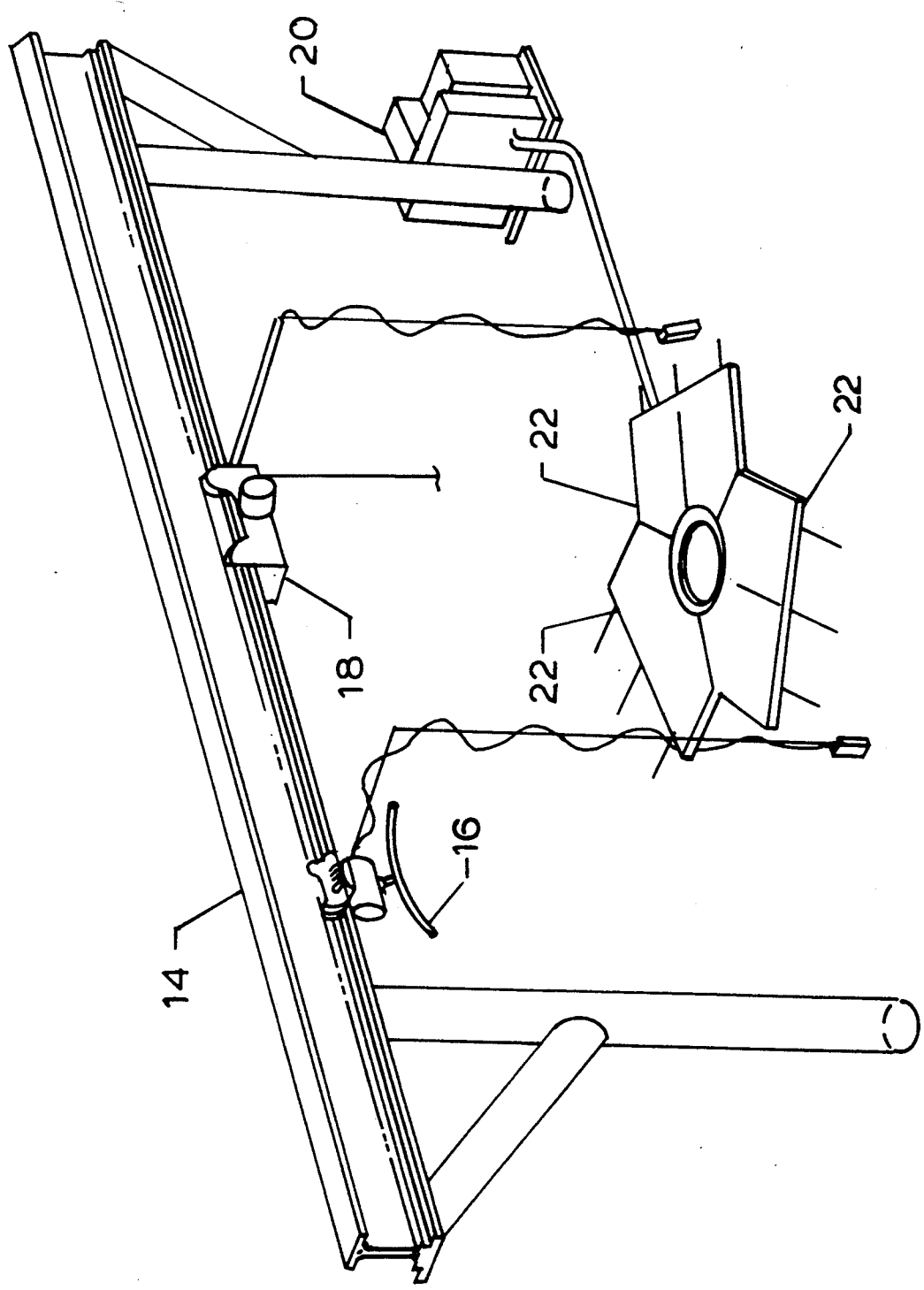
FIG. 2 shows an overall view of the basic facility.

FIG. 2 is schematic and is intended to present an overview of the basic facility. It consist of a basic framework 14, that supports a part handling winch 16, and a die and case handling winch 18. A controller/recorder 20 directs the hydraulic Die Positioning Base 22 to and from the holder mount ring 24. The facility is designed to handle singular, dual, and triple dies. Die movement is vertical for this example.

Figure 3:
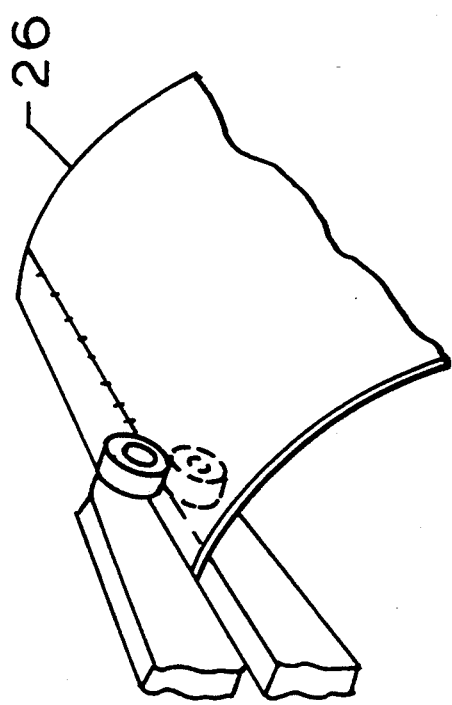
FIG. 3 shows an example of a sheet metal preform being welded, rolled, and roll planished into a 360° shape.

FIG. 3 shows sheet metal being prepared as a preform 26 by being welded, rolled, and planished into a 360° shape. The preform for sheet metal mixers and similar shapes is usually circular, but it can be conical.

Figure 4:
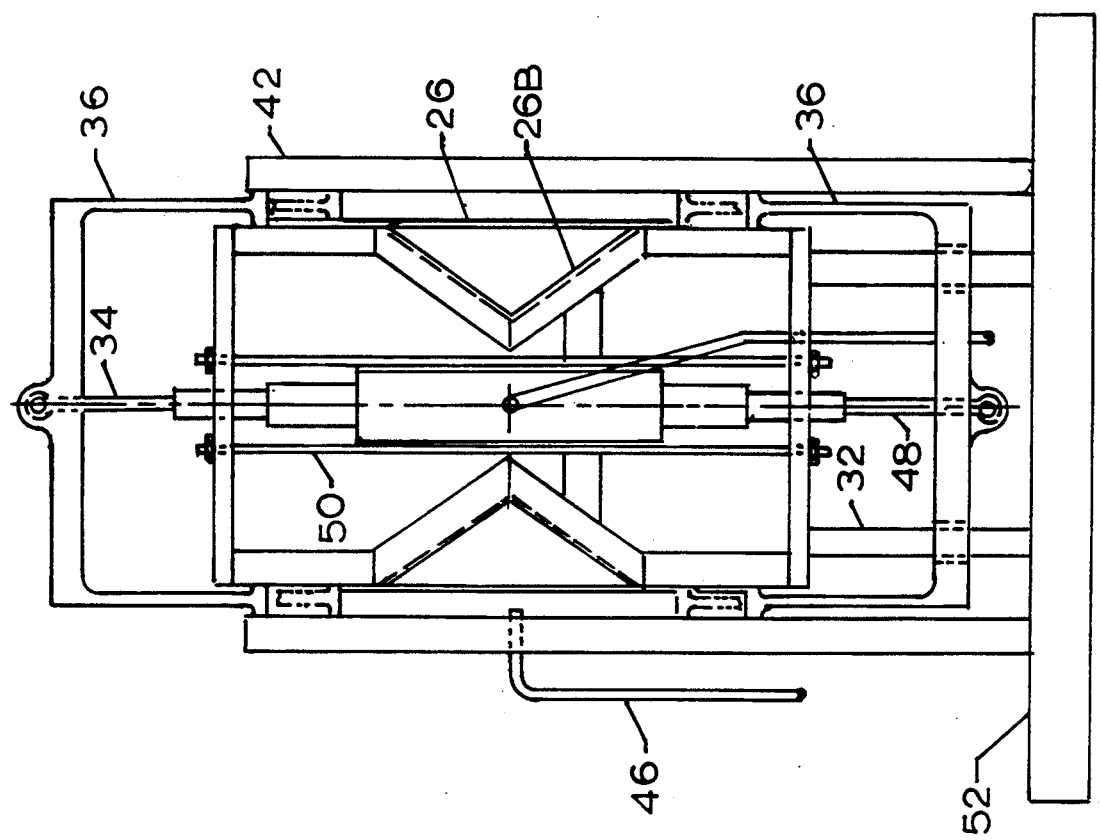
FIG. 4 shows a view of an apparatus that allows us to longitudinally end load a cylinder of metal as we apply pressure to the outside and cause it to form around blades towards the centerline of the cylinder.

FIG. 4 depicts an apparatus used to preform a cylinder 26. The apparatus consist of a double action actuator 34 mounted to the lower preform blade holder 30B. There are 2 Blade Holders 30 and 30B separated so that they can be removed after forming of 26. It is necessary to tie them together with rods 50 as there is a resultant upload on blade holder 30. The actuator 34 is end connected to plungers 36 used to apply end load to the cylinder 26 as forming pressure is applied through the forming pressure tube 42 and reacted by a pressure reactor 42 as 26 is formed inward. Stantions 32 mounted to the base 52 are provided to allow the plunger 36 to retract at the bottom.

Figure 5:
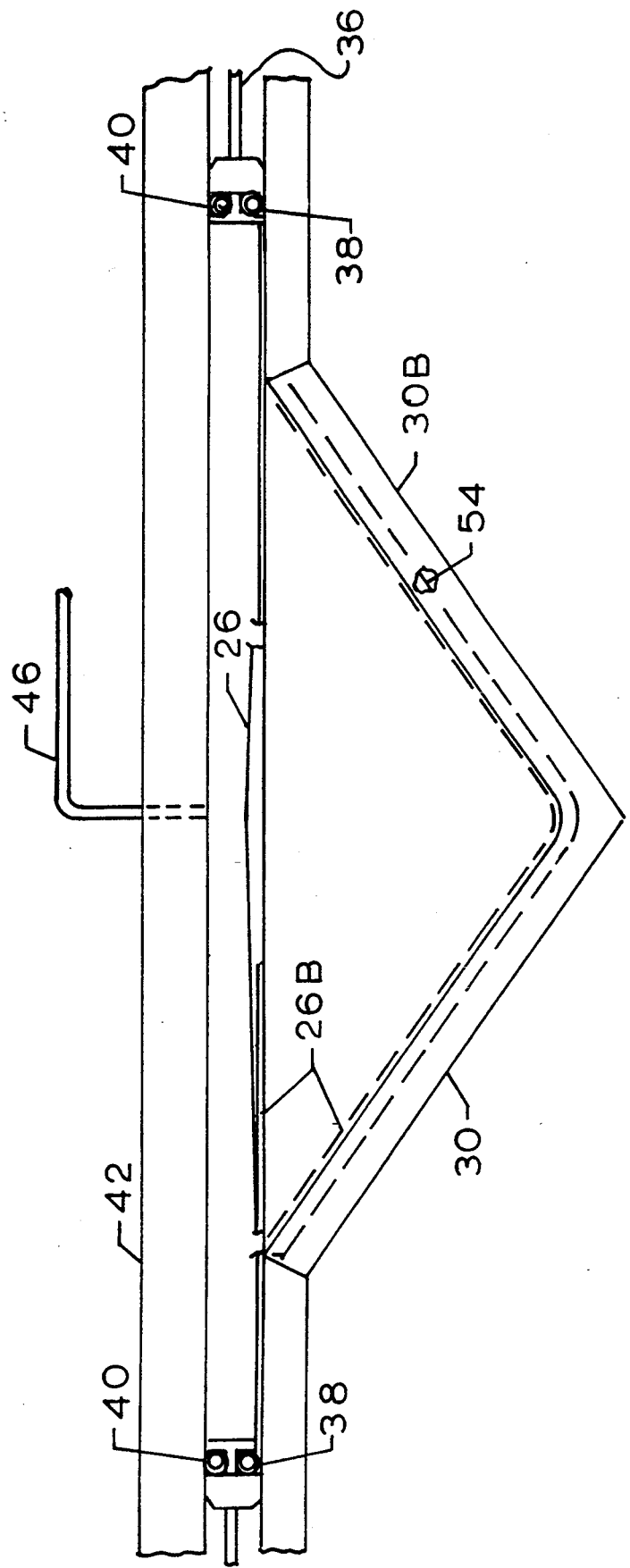
FIG. 5 shows that the cylinder has been profile machined and is pressure formed around a blade secured within a preform holder as plungers apply an end load to the cylinder.

FIG. 5 depicts a single blade 54 mounted in preform blade holders 30 and 30B. It shows the ends of plungers 36 and O-rings 38 and 40 preventing forming gas delivered through the forming pressure tube 46 from escaping. Pressure tube 46 penetrates the pressure reactor 42 at the centerline of the cylinder. FIG. 5 depicts 26 as a profile machined cylinder and 26B as a constant thickness as pressure forming causes the material to thin.

Figure 6:
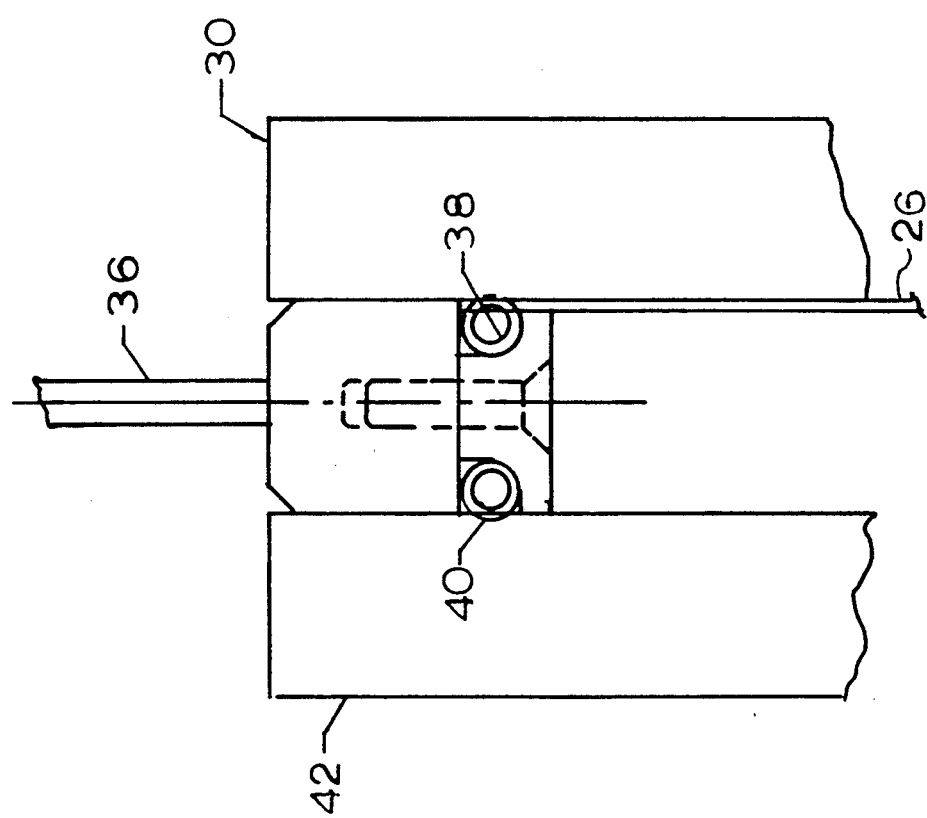
FIG. 6 is an enlargement showing O-ring seals that prevent the forming gas from escaping at the plunger ends as the plunger applies end load to the cylinder.

FIG. 6 is an enlargement of the plunger end and the o-ring sealing to pressure reactor 42 and blade holder 30. Plunger 36 is slip fit to pressure reactor 42 and blade holder 30.

Figure 7:
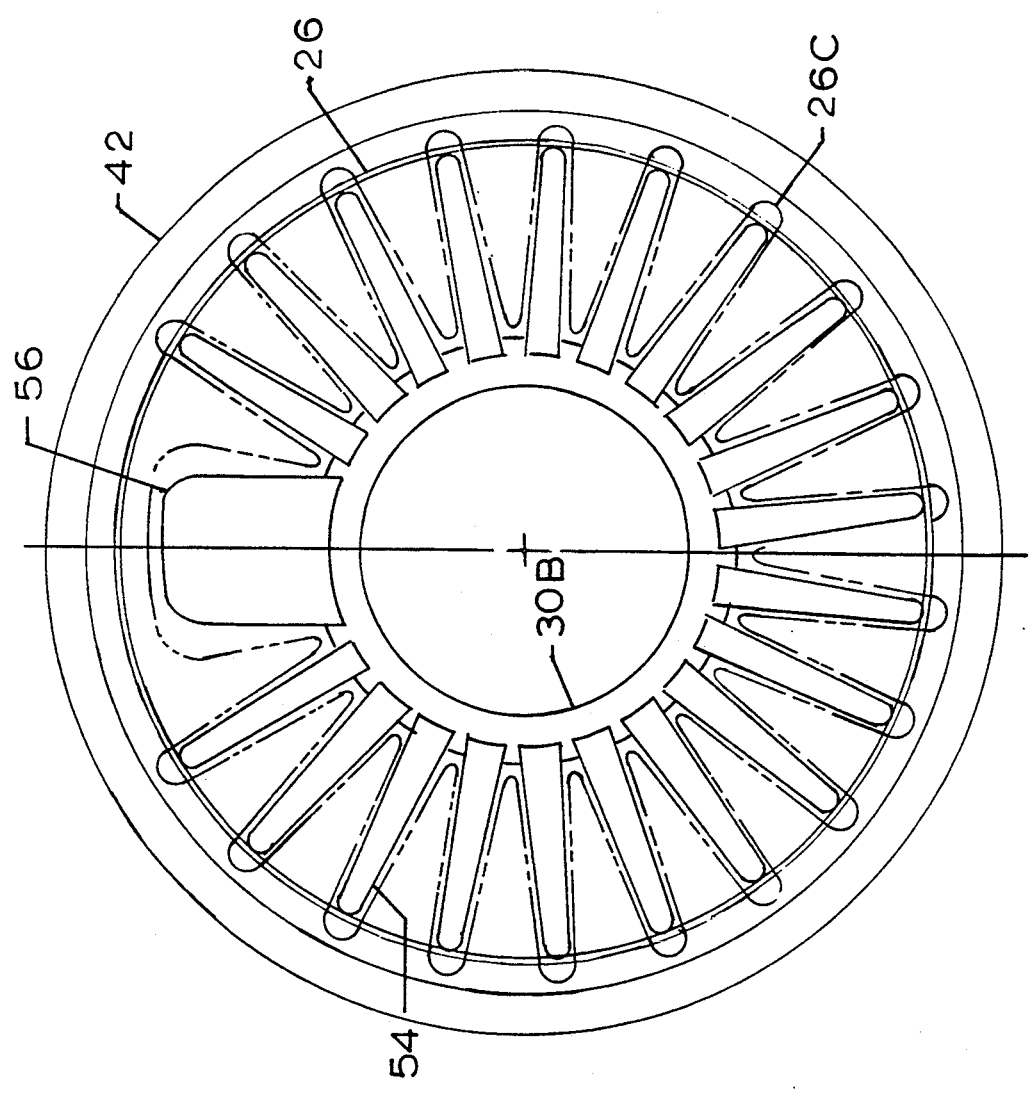
FIG. 7 is an end view showing the multiple common blades and the one unique blade located within the blade holder.

FIG. 7 shows multiple common preform blades 54 and the unique preform blade 56 mounted within machined slots in preform blade holder 30. Pressure reactor 42 is shown as is the final form position.

Figure 8:
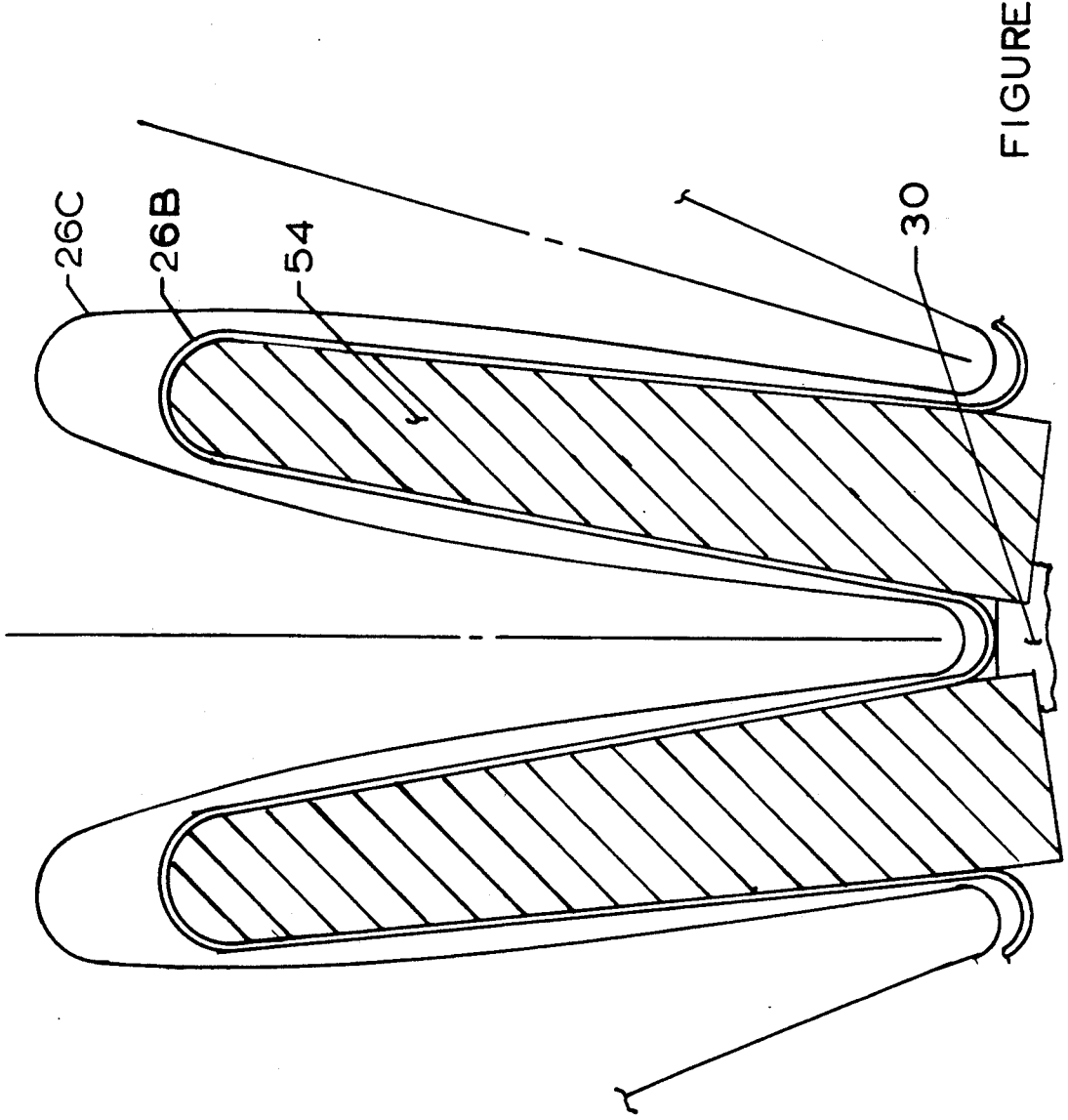
FIG. 8 is an enlarged view that depicts the preform shape around 2 of the multiple blades of FIG. 7 prior to final form.

FIG. 8 is an enlargement to depict 26B in position around 2 common blades 54 and now ready to be formed in the opposite direction around dies 62.

Figure 9:
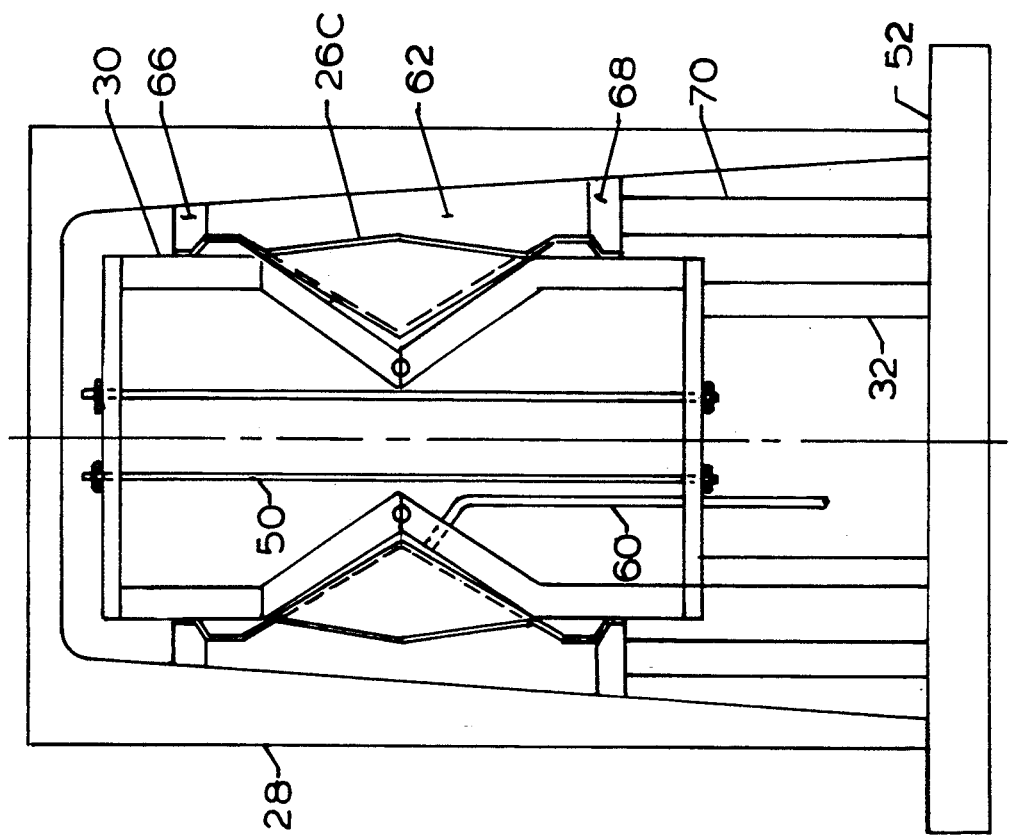
FIG. 9 is a view of an apparatus that allows us to take the preform described in FIGS. 1 through 8 and finish form it to its final shape by applying forming pressure radially outward causing the preformed shape to take the shape of the dies.

FIG. 9 is an apparatus and method of final forming the desired shape. 30 and 30B preform blade holders now become an internal pressure reactor to react forming pressure delivered through forming pressure tube 60 to cause preform cylinder 26B to move radially outward and take the shape of dies 62 and 64. The case 28 reacts outward pressure. Sealing cylinders 66 upper and 68 lower are included to react pressure applied by O-Rings 58 upper and 58 lower. Die station 70 supports the dies.

Figure 10:
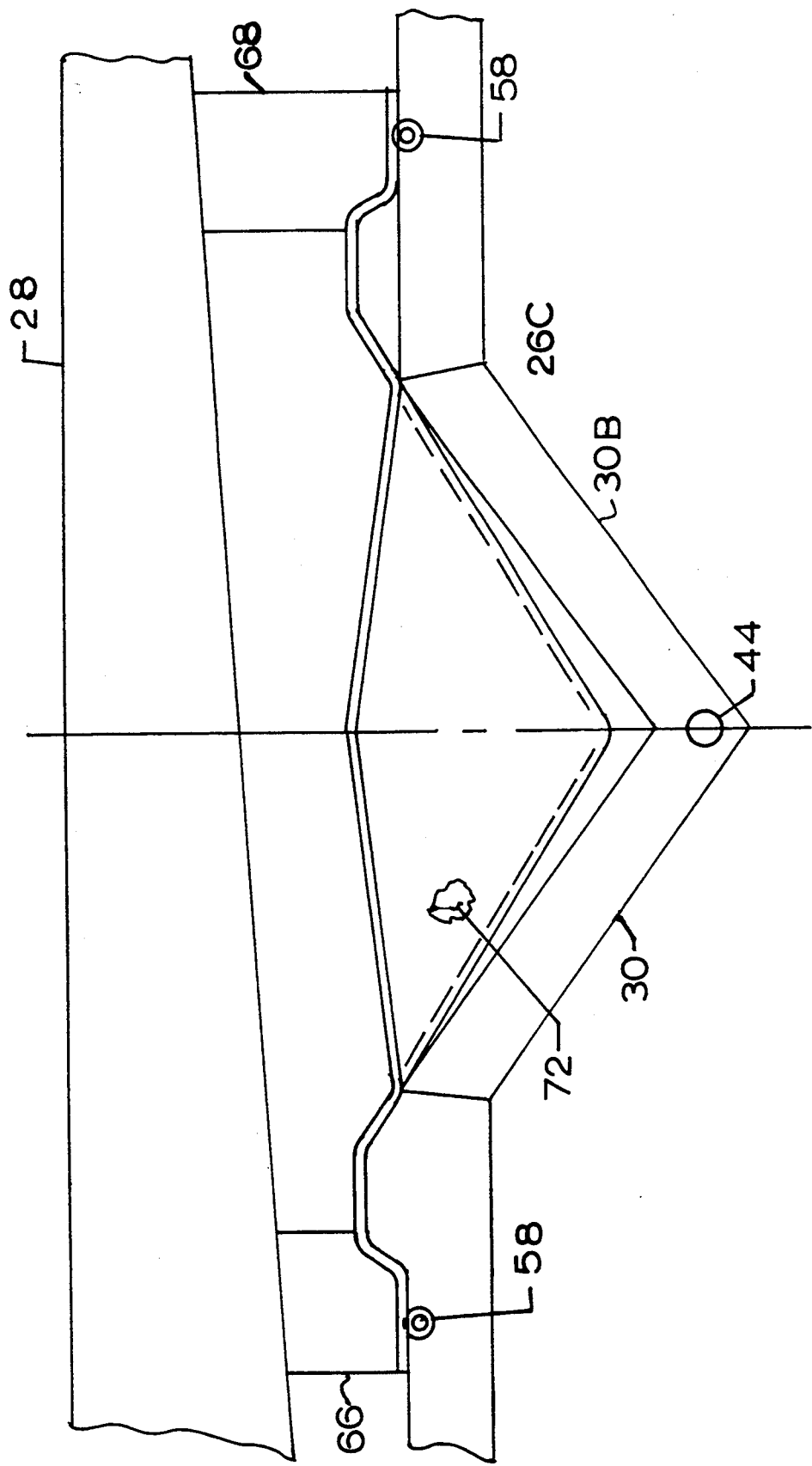
FIG. 10 is a side view of a single die to illustrate end sealing and pressure forming.

FIG. 10 is an enlargement to depict end sealing and a singular common die.

FIG. 11 is an end view showing the common dies 62 and the unique die 64 constrained by the case 28. Upon removal of the case the dies can be translated radially outward freeing the shape 26C for removal and further trimming into 2 mixers.

OPERATION—FIGS. 1 to 11

This facility has been designed to provide several services in a small area. This is the same facility described in the patent application "A METHOD OF HEAT ASSISTED SHEET METAL FORMING IN 360 DEGREE SHAPES". The sheet metal preforms shown in that system will be required. It was necessary to roll, weld, and planish the welds on a cylinder. The cylinder is profile machined to a varying thickness as shown in FIG. 5 in order to end up with the desired thickness along the longitudinal length of the shape. End loading is used to provide material and reduce the thickness. This resulted in a large material cost savings. The following are the steps necessary to produce an engine nacelle trailing edge mixer:

Preform (a) A preform apparatus was arranged by placing the station 32 through openings in lower plunger 36 and securing station 32 to the base 52. Lower preform holder 30B was placed on the stantion 32 and the double action actuator 34 was secured to lower plunger 36 and preform holder 30B. Tension rods 50 are in place through 30B. Upper preform holder 30 is installed and rods 50 are secured. Preform blades 54 and 56 are placed in machined slots in 30 and 30B.

(b) Preform shape 26 is installed with part loading winch 16. Pressure reactor 42 is installed with the die handling winch 18. Upper plunger 36 is installed and secured to the actuator 34. Forming pressure tube 46 is installed and checked.

(c) The controller recorder 20 causes the actuator 34 to retract applying end load to the cylinder 26 as forming gas pressure is delivered through the pressure forming tube 46 to the outside of the cylinder 26 causing it to crush as directed around the multiple preform blades 54 and the unique preform 56 until the material stikes preform holders 30 and 30B.

(d) The preform apparatus is disassembled by removing pressure forming tube 46. The upper plunger 36 is removed with die winch 18. Rod 50 retaining nuts are removed at the top of preform holder 30 and preform holder 30 is removed with the die winch 18. Pressure reactor 42 is removed with die winch 18. Shape 26B is removed with part winch 16. Common preform blades 54 and unique preform blade 56 are removed. Actuator delivery tube 48 is disconnected and the the lower holder 30B and actuator 34 is removed. Stantion 32 and lower plunger 36 are removed. Final form:

(e) An apparatus for final forming is assembled by securing stantions 32 and 70 to the base 52. Lower holder 36B is secured to stantion 32. Pressure forming tube 60 is connected to lower holder 30B. Seal 44 is placed on holder 30B. Shape 26B is placed on lower holder 30B. Top holder 30 is placed on lower holder 30B compressing seal 44. Sealing cylinder 68 is placed around 26b shape and onto die stantion 70. Common dies 62 and unique die 64 are installed on sealing cylinder 68. Sealing cylinder 66 is placed on the stack. The case 28 is placed around and secured to the base 52.

(f) Forming pressure is delivered through the forming pressure tube 60 to the inside of the preform shape 26B causing it to elongate radially outward and take the shape of the common dies 62 and the unique die 64.

(g) The apparatus is disassembled by removing the case 28 with the die handling winch 18. The upper seal ring is removed with die handling winch 18. The common dies 62 and the unique die 64 are removed. Rod 50 retaining nuts are removed at the top of holder 30 and holder 30 is removed with the die handling winch 18. The finished shape 26C is removed with the part handling winch 16. Shape 26C is now available to be trimmed into 2 mixers.

(H) By following the operations noted we will end up with a shape that has been final sized to a die and will meet the aerodynamic specifications and all dimensional requirements.

I claim:

1. A method for integrally forming aircraft engine nacelle exhaust mixers from a tubular sleeve made of sheet metal comprising the steps of:
    a) taking one or more flat sheets of metal and forming the flat sheets into a cylindrical preform shape having abutting edges, top and bottom edges and a longitudinal axis and welding the abutting edges of the cylindrical preform shape together, said cylindrical preform shape having an outer surface and an inner surface;
    b) inserting the cylindrical preform shape into a cylindrical pressure reactor having an inner surface and top and bottom edges so that the outer surface of said cylindrical preform shape opposes the inner surface of said cylindrical pressure reactor;
    c) positioning a plurality of preform blades into radially extending slots in a preform blade holder and positioning said preform blade holder inside said cylindrical preform;
    d) sealing the top and bottom edges of said cylindrical preform with the interior of said cylindrical pressure reactor to form a first cylindrical chamber between the cylindrical preform shape and the cylindrical pressure reactor;
    e) applying pressure to the interior of said first cylindrical chamber to force the inner surface of said cylindrical preform shape into the radially extending spaces between said respective radially extending preform blades;
    f) releasing the seals on the top and bottom edges of said cylindrical preform shape the removing said cylindrical pressure reactor and positioning dies having blade shaped cavities into position surrounding the outside surface of said cylindrical preform shape;
    g) sealing the top and bottom edges of said cylindrical preform shape and said dies and installing a case over said cylindrical preform shape and said dies;
    h) applying pressure to the inner surface of said cylindrical preform shape to force its outer surface against the blade shaped cavities of said dies to give a final form to said nacelle exhaust mixer;
    i) removing said nacelle exhaust mixer.

2. A method for integrally forming aircraft engine nacelle exhaust mixers as recited in claim 1 further comprising the step of profile machining the outer surface of said cylindrical preform to an empirically determined thickness along its length, this step taking place after step (a) and before step (b).

3. A method for integrally forming aircraft engine nacelle exhaust mixers as recited in claim 1 further comprising the step of longitudinal end loading of the top and bottom edges of said cylindrical preform while applying the pressure of step (e) to the interior of said cylindrical chamber.

4. A method for integrally forming aircraft engine nacelle exhaust mixers as recited in claim 1 wherein two exhaust mixers are formed from said cylindrical preform.

* * * * *